(12) United States Patent
Liu

(10) Patent No.: US 8,214,898 B2
(45) Date of Patent: Jul. 3, 2012

(54) ICAP PROCESSING OF PARTIAL CONTENT TO IDENTIFY SECURITY ISSUES

(75) Inventor: Zhiping Liu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1212 days.

(21) Appl. No.: 11/362,022

(22) Filed: Feb. 27, 2006

(65) Prior Publication Data

US 2007/0245031 A1     Oct. 18, 2007

(51) Int. Cl.
*H04L 29/06* (2006.01)

(52) U.S. Cl. .............. 726/23; 726/22; 726/24; 726/25; 726/26; 713/153; 713/154; 713/187; 713/188

(58) Field of Classification Search .................. 726/24, 726/22, 23, 25, 26–33; 713/153, 154, 187, 713/188
See application file for complete search history.

(56) References Cited

U.S. PATENT DOCUMENTS

| | | | |
|---|---|---|---|
| 6,006,329 A * | 12/1999 | Chi | 726/24 |
| 6,088,803 A * | 7/2000 | Tso et al. | 726/22 |
| 6,742,146 B2 * | 5/2004 | Gross et al. | 714/702 |
| 7,236,992 B2 * | 6/2007 | Yano et al. | 707/203 |
| 2002/0090206 A1 * | 7/2002 | Kikuchi et al. | 386/111 |
| 2003/0236883 A1 * | 12/2003 | Takeshima et al. | 709/225 |

OTHER PUBLICATIONS

Network Appliance; "Internet Content Adaptation Protocol (ICAP)"; Version 1.01; Jul. 30, 2001; 13 pages.
J. Elson et al.; "Internet Content Adaptation Protocol (ICAP)"; www.i-cap.org; Request for Comments: 3507; Apr. 2003; 46 pages.

* cited by examiner

*Primary Examiner* — Vivek Srivastava
*Assistant Examiner* — Thong Truong
(74) *Attorney, Agent, or Firm* — Harrity & Harrity, LLP

(57) ABSTRACT

A system receives a first part of a response that includes a number of parts, determines whether there is a security issue associated with the first part of the response, stores the first part of the response when there is no security issue associated with the first part of the response, and causes the first part of the response to be transmitted toward a destination when there is no security issue associated with the first part of the response. The system also receives a last part of the response, combines the last part of the response with at least the first part of the response to obtain combined parts of the response, processes the combined parts of the response to determine whether there is a security issue associated with the combined parts of the response, and causes the last part of the response to be transmitted toward the destination when there is no security issue associated with the combined parts of the response.

27 Claims, 10 Drawing Sheets

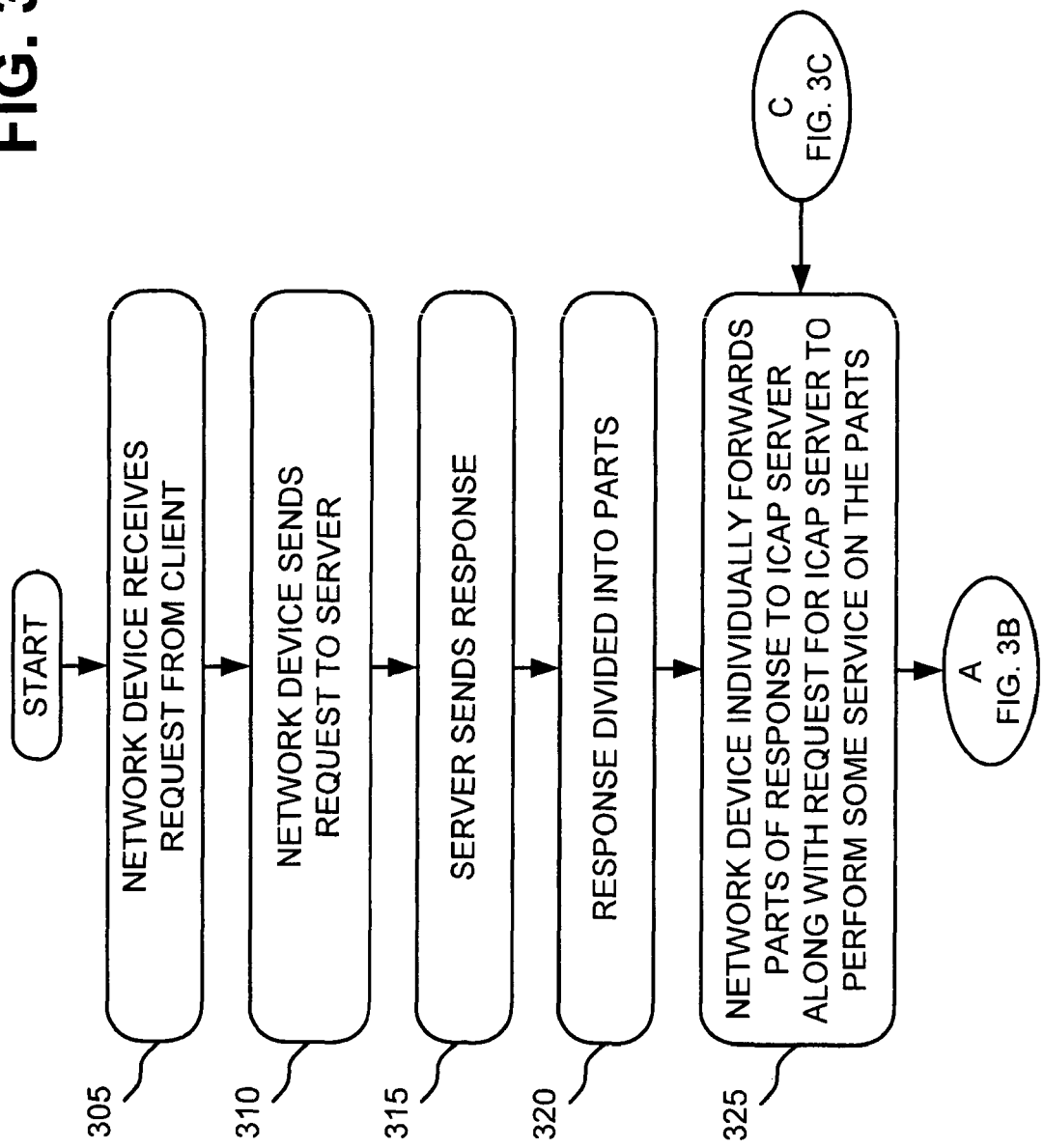

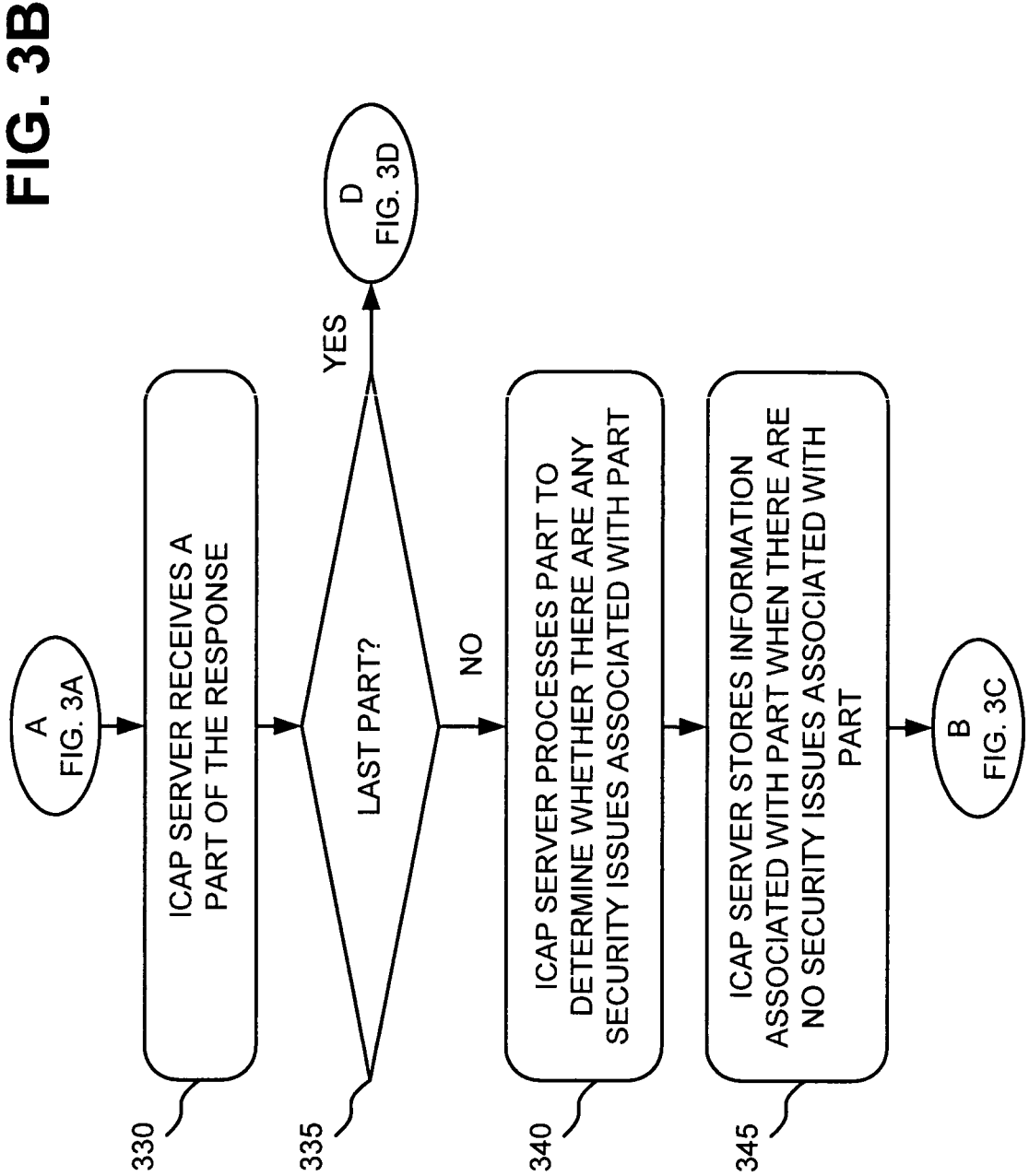

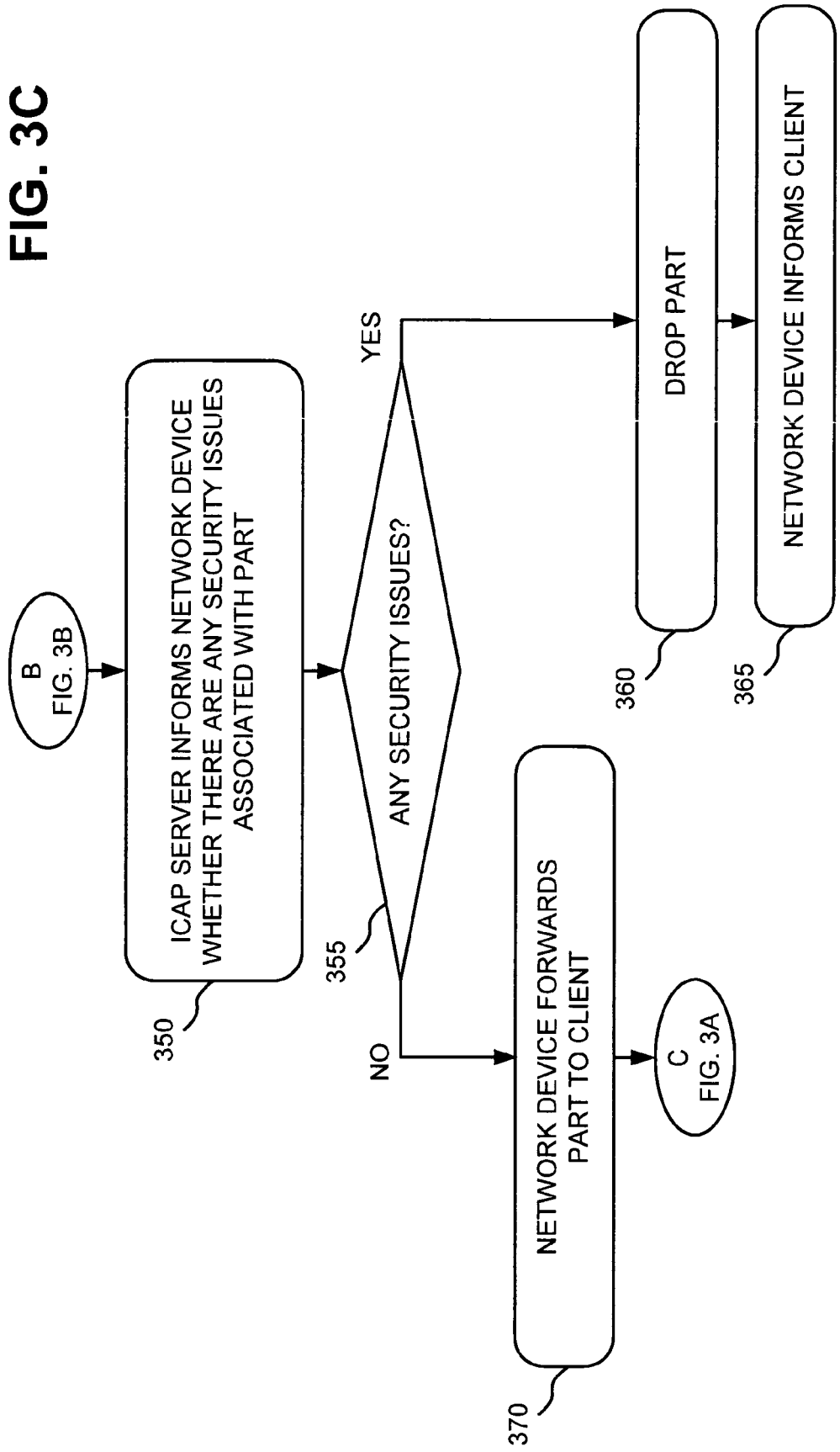

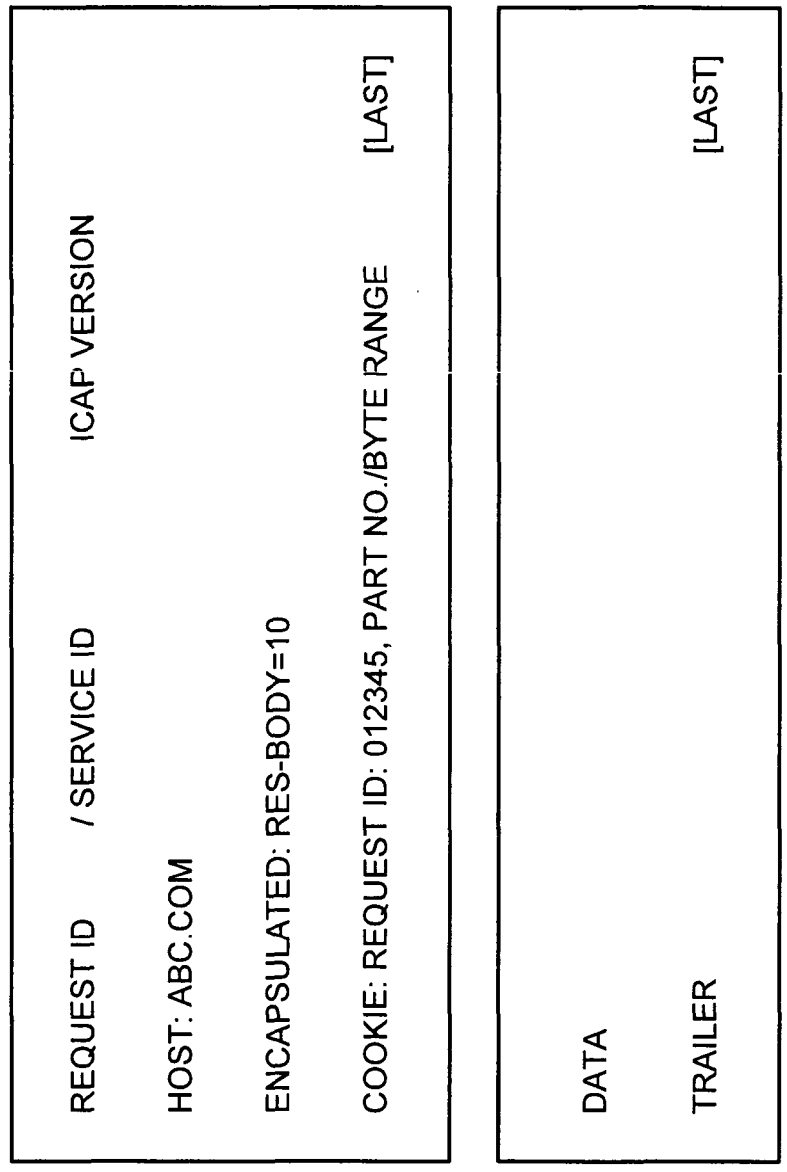

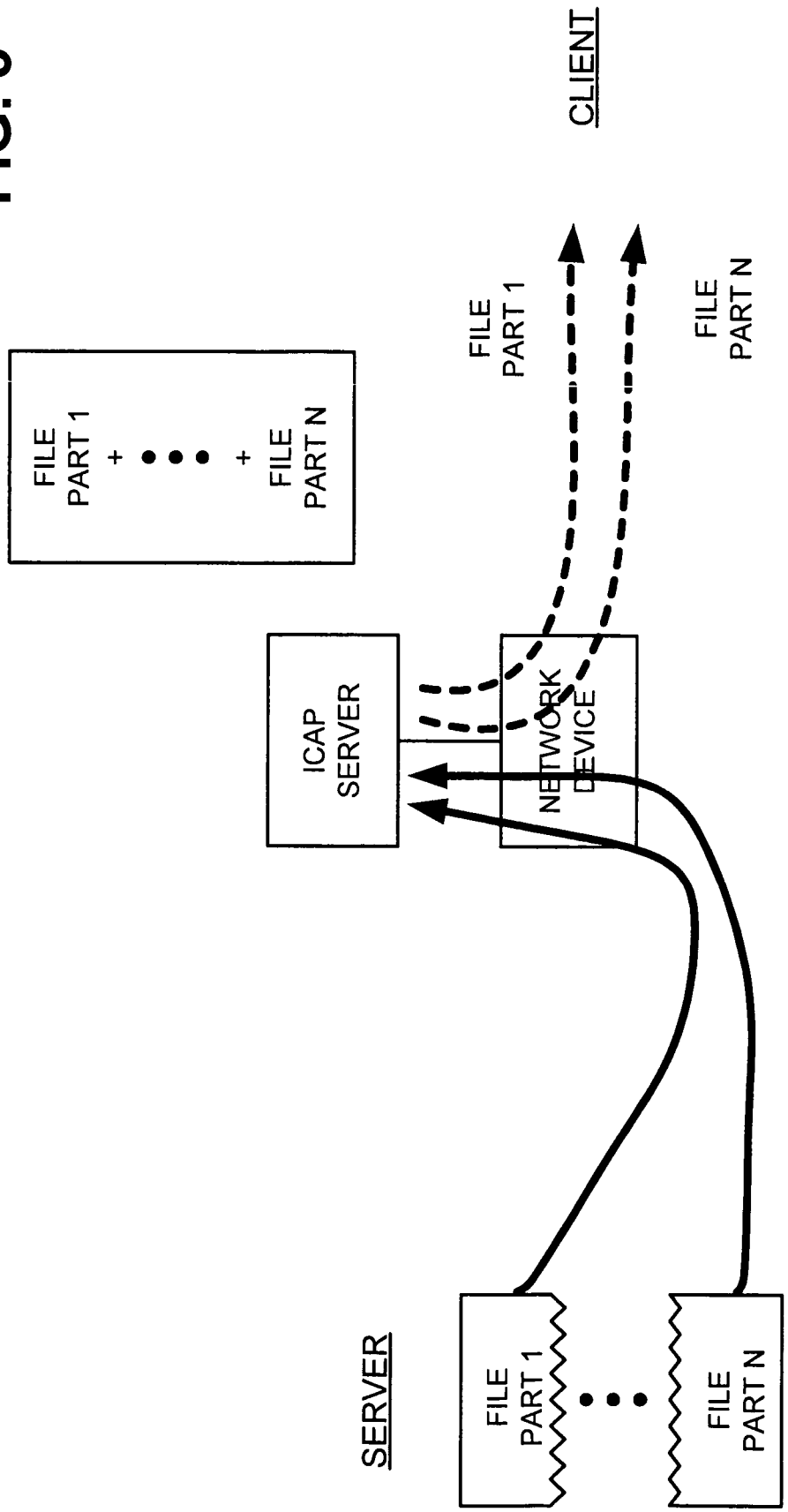

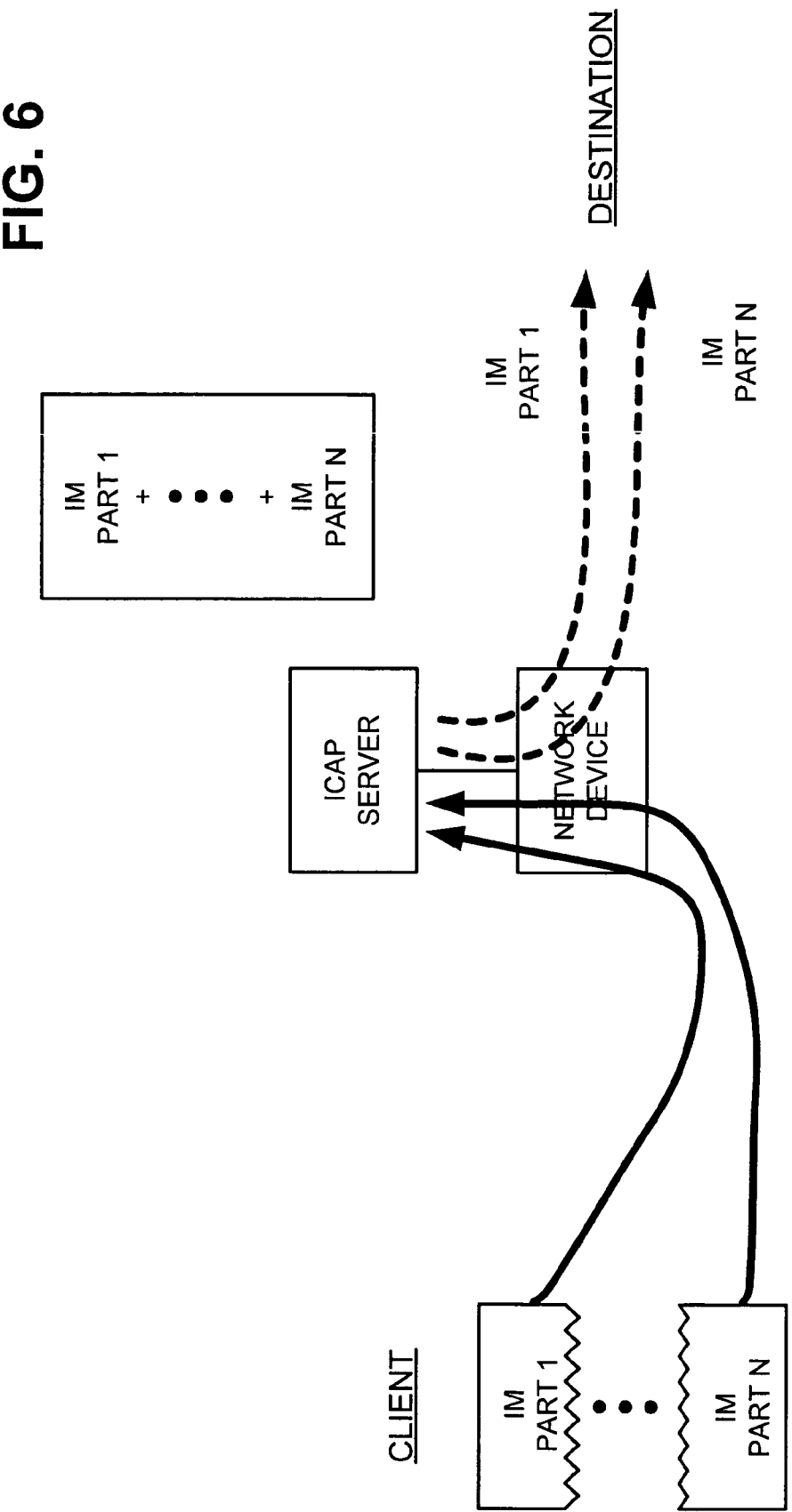

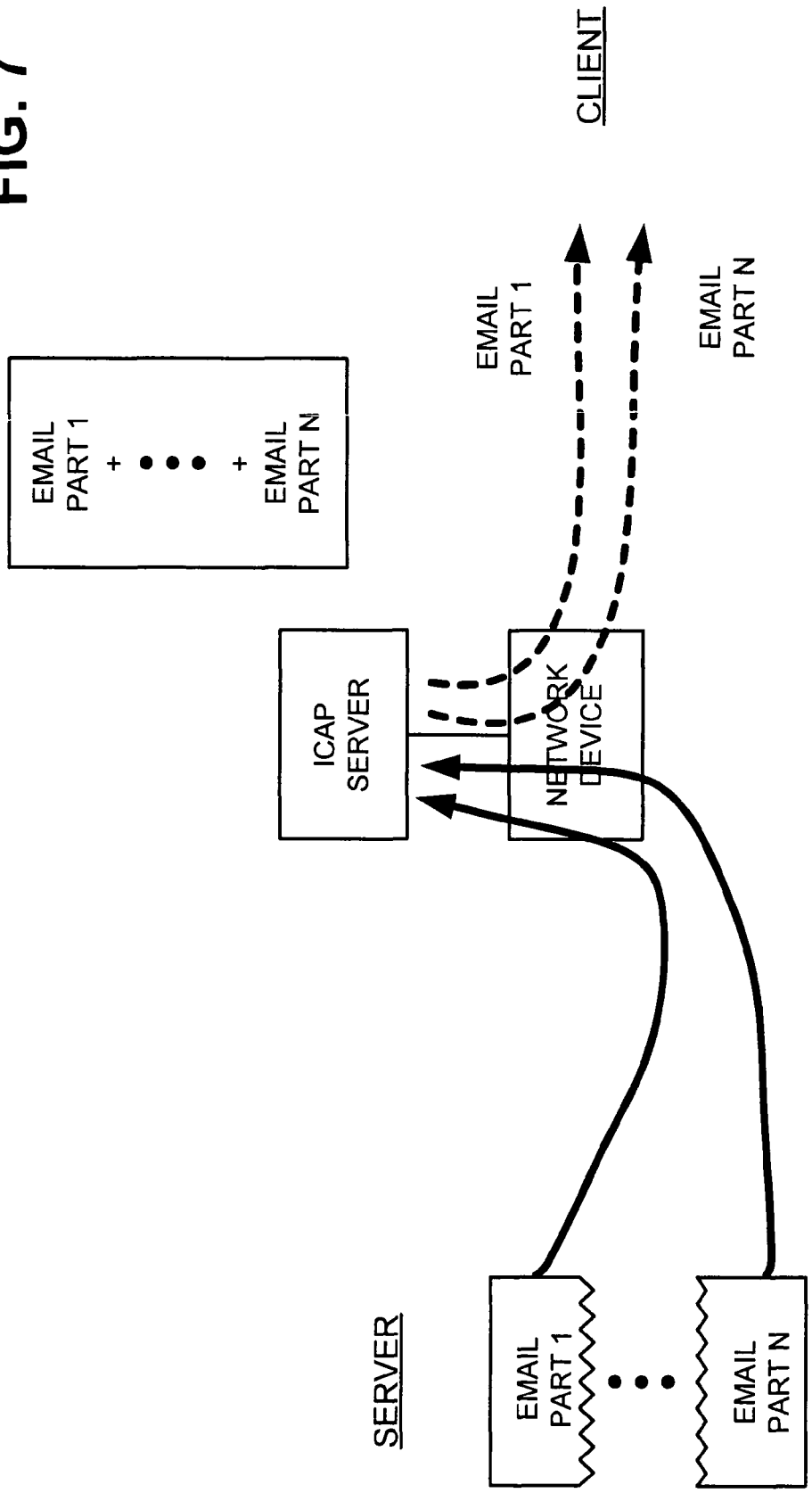

US 8,214,898 B2

ICAP PROCESSING OF PARTIAL CONTENT TO IDENTIFY SECURITY ISSUES

BACKGROUND

1. Field of the Invention

Implementations consistent with the principles of the invention relate generally to data processing and, more particularly, to Internet Content Adaptation Protocol (ICAP) processing of partial content to identify security issues.

2. Description of Related Art

ICAP is a protocol designed to off-load specific Internet-based content to dedicated servers, thereby freeing up resources. These ICAP servers are focused on a specific function, such as insertion of advertisements, virus scanning, content translation, language translation, or content filtering.

A problem that occurs with existing ICAP servers is that content is sometimes divided into smaller portions before being delivered to its destination. The ICAP servers act upon these portions individually. As a result, the ICAP servers can miss security issues that do not occur within a single portion, but instead span across multiple portions.

SUMMARY

According to one aspect, an ICAP server may include a memory and a processor connected to the memory. The processor may receive a part of a response that includes a number of parts and combine the part of the response with at least one previously received part of the response stored in the memory to obtain combined parts of the response. The processor may also process the combined parts of the response to determine whether there is a security issue associated with the combined parts of the response and cause the part of the response to be transmitted toward a destination when there is no security issue associated with the combined parts of the response.

According to another aspect, an ICAP server may include a memory and a processor connected to the memory. The processor may receive a first part of a response that includes a number of parts, process the first part of the response to determine whether there is a security issue associated with the first part of the response, and store the first part of the response in the memory when there is no security issue associated with the first part of the response. The processor may also receive a last part of the response, combine the last part of the response with at least the first part of the response to obtain combined parts of the response, process the combined parts of the response to determine whether there is a security issue associated with the combined parts of the response, and cause the last part of the response to be transmitted toward a destination when there is no security issue associated with the combined parts of the response.

According to yet another aspect, a system may include a network device and a server connected to the network device. The network device may receive parts of a response associated with a client, the response being divided into the number of parts, and individually transmit each of the parts. The server may receive one of the parts from the network device, combine the one of the parts with another one of the parts that was previously received from the network device to obtain combined parts, and process the combined parts to determine whether there is a security issue associated with the combined parts.

According to a further aspect, a method, performed by an ICAP server, may include receiving a first part of a response that includes a number of parts; storing the first part of the response; causing the first part of the response to be transmitted toward a destination; receiving a second part of the response; combining the second part of the response with at least the first part of the response to obtain combined parts of the response; processing the combined parts of the response to determine whether there is a security issue associated with the combined parts of the response; and causing the second part of the response to be transmitted toward the destination when there is no security issue associated with the combined parts of the response.

According to another aspect, an ICAP request transmitted from a network device to an ICAP server to request a service with regard to a part of a response that has been divided into a number of parts is provided. The ICAP request may include an ICAP header and an ICAP body. The ICAP header may include a service identifier that identifies the service to be performed by the ICAP server on the part of the response, a request identifier that uniquely corresponds to the response, and a part number that uniquely identifies the part of the response with regard to other ones of the parts of the response or a byte range that identifies a set of bytes of the response associated with the part of the response. The ICAP body may include data associated with the part of the response.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 3A-3D provide a flowchart of an exemplary operation for processing partial content according to an implementation consistent with the principles of the invention;

FIG. 4 is an exemplary diagram of an ICAP request; and

FIGS. 5-7 are diagrams of exemplary implementations consistent with the principles of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the principles of the invention relate to processing associated with a network device and/or an ICAP server in matching partial content relating to the same response in order to detect security issues.

Exemplary Network

Figure 1:
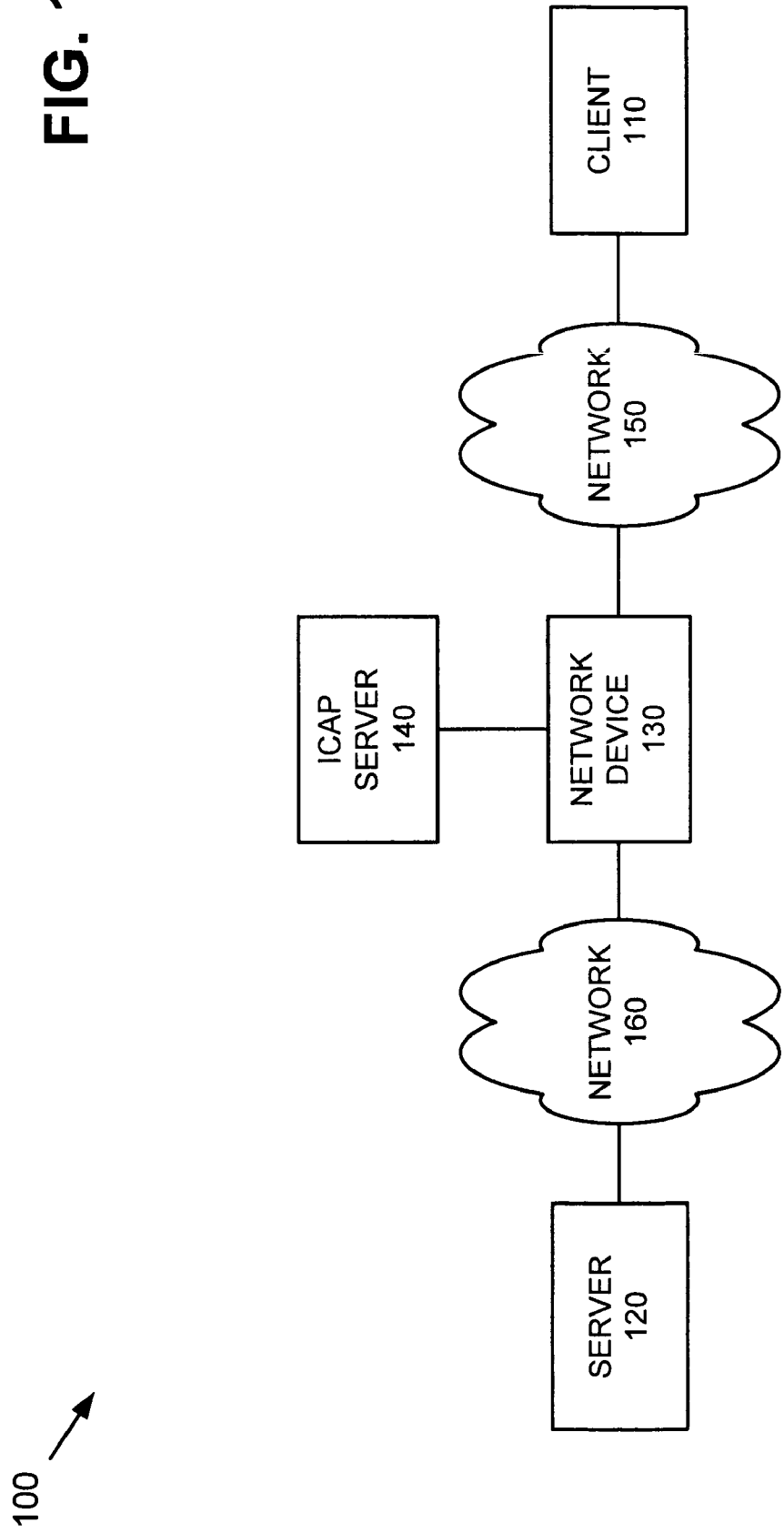
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include a client 110, a server 120, a network device 130, and an ICAP server 140. A single client 110, server 120, network device 130, and ICAP server 140 have been illustrated in FIG. 1 for simplicity. In practice, there may be more clients 110, servers 120, network devices 130, and/or ICAP servers 140. Also, in some instances, client 110 may perform a function of server 120 and/or server 120 may perform a function of client 110.

Client 110 and server 120 may each include a device, such as a personal computer, a wireless telephone, a personal digital assistant (PDA), a lap top, or another type of computation or communication device, or a process running on one of these devices. In one implementation, client 110 and/or server 120 may take the form of a provider of network content, such as a file, a web page, an email, or an instant message.

Network device 130 may include a data transfer device, such as a gateway, a router, a switch, a firewall, a bridge, a proxy server, or some other type of device that processes and/or transfers data. In one implementation, network device 130 may operate on data on behalf of client 110 (and possibly other clients (not shown)). For example, network device 130 may receive all, or substantially all, data destined for client 110 and/or transmitted by client 110.

ICAP server 140 may include a server, or a set of servers, operating based on ICAP to perform one or more operations on behalf of network device 130. Network device 130 may operate an ICAP client process that may interact with an ICAP server process operating on ICAP server 140. Generally, network device 130 may send a request to ICAP server 140 to perform a service, such as check for a virus and/or spyware, perform content filtering, or identify spam, phishing, or farming, with regard to data received by network device 130. ICAP server 140 may perform the service and provide the results to network device 130. Network device 130 may use the results in determining, for example, whether to drop the data or send the data to client 110 (or elsewhere).

As shown in FIG. 1, client 110 may connect to network device 130 via network 150 and server 120 may connect to network device 130 via network 160. Network 150 may include a local area network (LAN) or a private network, such as a company intranet. Network 160, on the other hand, may include a wide area network (WAN), a telephone network, such as the Public Switched Telephone Network (PSTN), the Internet, or a combination of networks.

Exemplary Device Architecture

Figure 2:
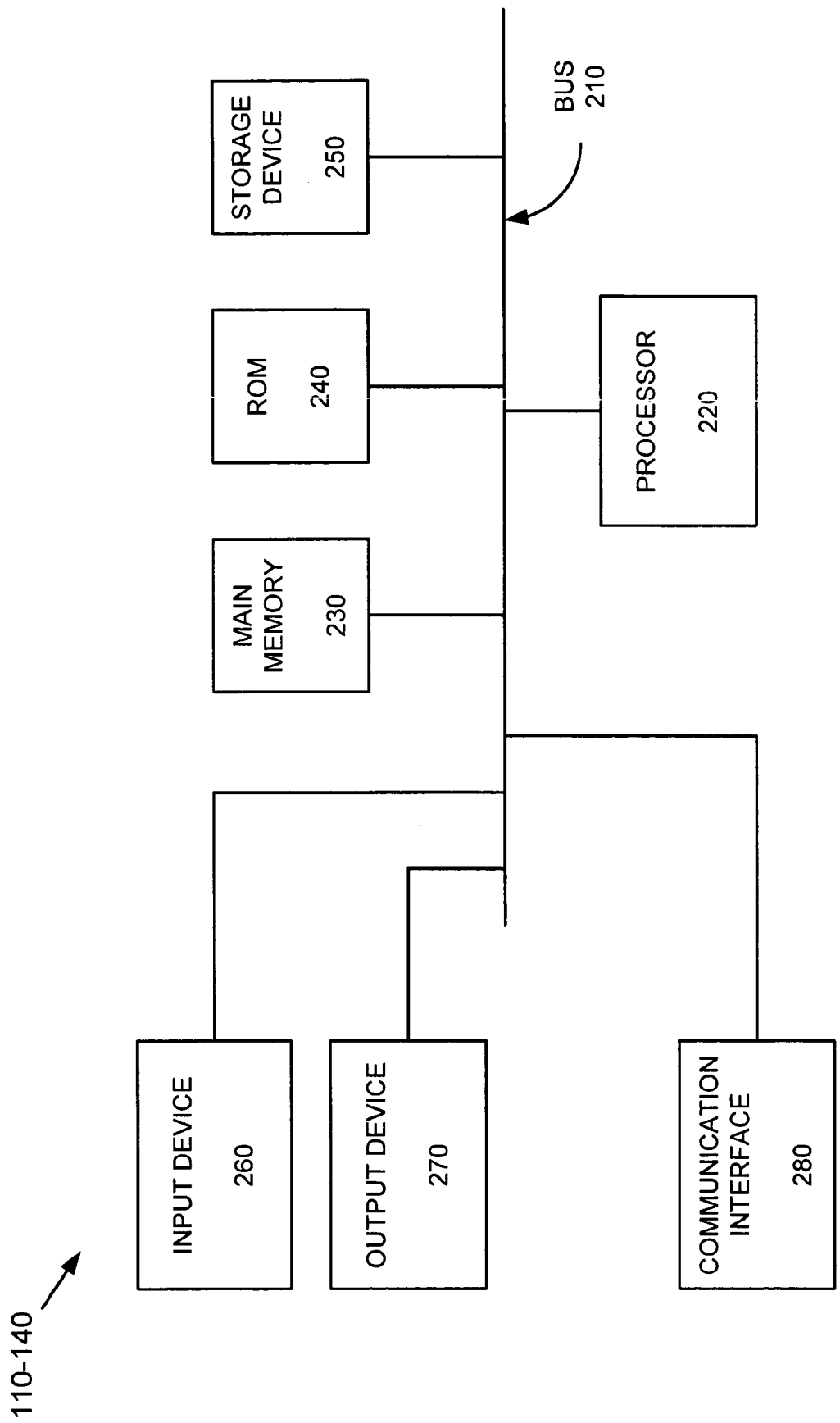
FIG. 2 is an exemplary block diagram of a device that may correspond to the client, server, network device, and/or ICAP server of FIG. 1.

FIG. 2 is an exemplary block diagram of a device, which may correspond to client 110, server 120, network device 130, and/or ICAP server 140. The device may include a bus 210, a processor 220, a main memory 230, a read only memory (ROM) 240, a storage device 250, an input device 260, an output device 270, and a communication interface 280. Bus 210 may include a path that permits communication among the elements of the device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

The device, consistent with the principles of the invention, may perform certain operations, as described in detail below.

The device may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

FIGS. 3A-3D provide a flowchart of an exemplary operation for processing partial content according to an implementation consistent with the principles of the invention. In the description to follow, assume that a client (e.g., client 110) requests content from a server (e.g., server 120). In another implementation, client 110 may receive content from server 120, or another source, without requesting it. For example, client 110 may receive an email, an instant message, or some other form of text message. In yet another implementation, client 110 may transmit solicited or unsolicited content. This content, whether originating at server 120, client 110, or another source, will be referred to hereinafter as a "response."

Figure 3D:
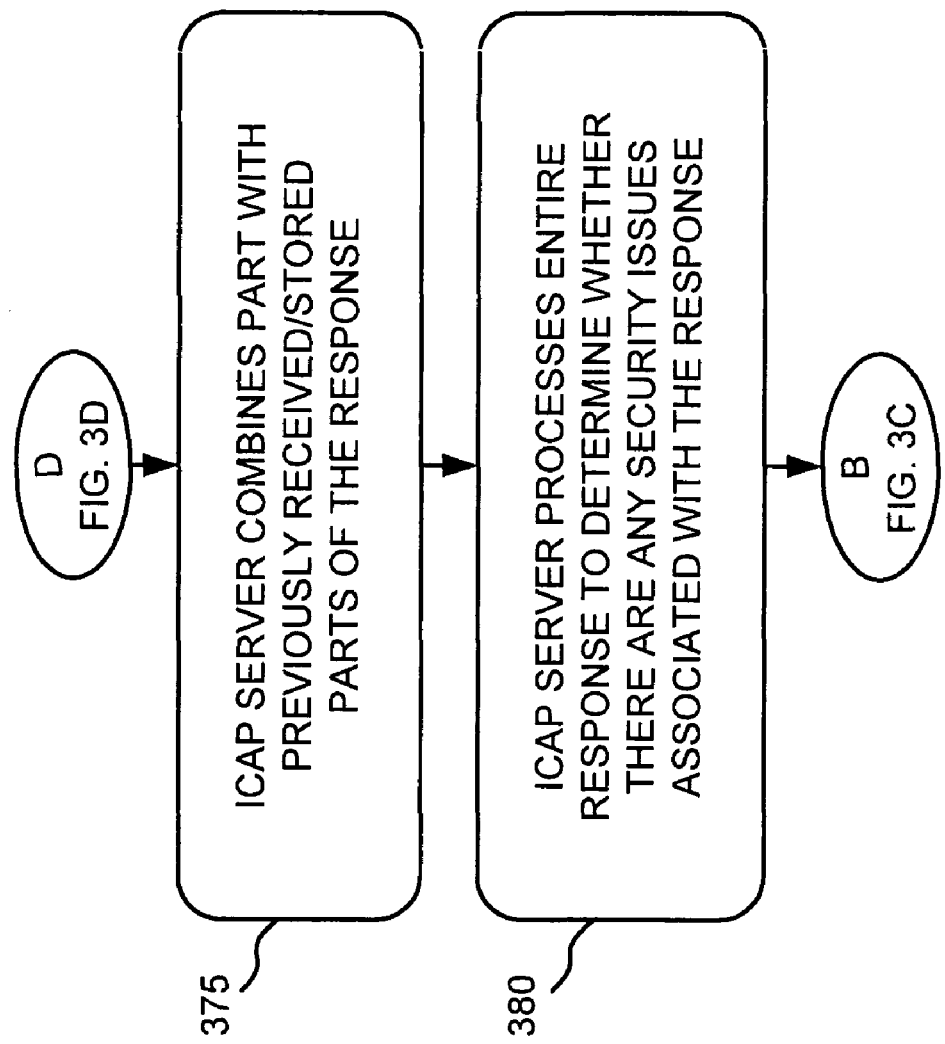

The processing of FIGS. 3A-3D may begin with client 110 sending a request for content from server 120. For example, a user of client 110 may enter an address, or otherwise access, a web page of server 120 using, for example, a browser application running on client 110. Network device 130 may receive the request from client 110 and send the request to server 120 (blocks 305 and 310) (FIG. 3A). For example, network 130 may analyze the content of the request and determine that the request is intended for server 120. Network device 130 may then forward the request to server 120.

Server 120 may receive the request, process the request (as necessary), and send a response (block 315). The response may take the form of the content requested by client 110. Assume that the response is large, such that sending the response in a single message would cause client 110 (or another device) to time-out. Therefore, the response may be divided into a number of parts (block 320). In one implementation, server 120 may divide the response into parts itself prior to sending the response. In another implementation, network device 130 may divide the response into parts if it determines that client 110 may time-out before client 110 receives the response from network device 130.

In either event, network device 130 may individually forward the parts of the response to ICAP server 140 along with a request for ICAP server 140 to perform a service on the parts (block 325). For example, network device 130 may include each part in an ICAP request that it sends to ICAP server 140.

FIG. 4 is an exemplary diagram of an ICAP request. The ICAP request may include an ICAP header 410 and an ICAP body 420. ICAP header 410 may include an identifier, a service identifier, an ICAP version, a host, an encapsulation, and a cookie. In practice, ICAP header 410 may include additional information or another kind of information.

The identifier may indicate whether the ICAP request is associated with modification of a request (REQMOD) or modification of a response (RESPMOD). Network device 130 may request that ICAP server 140 modify a request from client 110. One example of this might be when client 110 is attempting to send an instant message that might be checked by ICAP server 140 to determine whether the instant message includes information that violates a company policy. Network device 130 may request that ICAP server 140 modify a response from server 120. One example of this might be when server 120 is attempting to send a web page that might be checked by ICAP server 140 to determine whether the web page includes a virus.

The service identifier might indicate the type of service that ICAP server 140 is being requested to perform. For example, ICAP server 140 may be capable of performing a number of services, such as virus and/or spyware checking, content filtering, and/or spam, phishing, and/or farming identification. The ICAP version might identify the version of ICAP that is used by network device 130 and ICAP server 140. The host might identify the domain or host associated with server 120. The encapsulation might identify an offset at which various sections of the ICAP request occur relative to the start of ICAP body 420.

The cookie might identify a request identifier, a part number or byte range, and perhaps a last identifier. The request identifier may uniquely identify ICAP requests associated with the same response. ICAP server 140 may use the request identifier to match ICAP requests associated with different parts of the same response together, as described below.

The part number or byte range may identify the particular part included in the ICAP request. When the part number is used, the part number may include an integer corresponding to the part (e.g., 1, 2, etc.). When the byte range is used, the byte range may identify the bytes corresponding to the part (e.g., bytes 1-3, bytes 4-6, etc.). The byte range may be useful to identify parts that include overlapping information. For example, it is possible for one part to include bytes 1-3 and another part to include bytes 3-5. ICAP server 140 may identify this overlap and drop one of the instances of byte 3.

The last identifier may identify whether the ICAP request is associated with a last part of the response. This information may be beneficial for ICAP server 140 to determine when it has received all of the parts of the response. The last identifier may identify a first part as a last part when the response has not been divided.

ICAP body 420 may include data and a trailer. In practice, ICAP body 420 may include additional information or another kind of information. The data may include data associated with the part. For example, the data may include a portion (or all) of the data associated with a web page, an email, an instant message, etc. The trailer may include various information, such as a last identifier. The last identifier, as described above, may identify whether the ICAP request is associated with a last part of a response. This information may be beneficial for ICAP server 140 to determine when it has received all of the parts of the response. The last identifier may identify a first part as a last part when the response has not been divided.

Turning to FIG. 3B, ICAP server 140 may receive a part of the response in an ICAP request from network device 130 (block 330). ICAP server 140 may determine whether the part is the last part in the response (block 335). For example, ICAP server 140 may analyze information in ICAP header 410 (FIG. 4) and/or ICAP body 420 to determine whether the part is the last part in the response.

When the part is not the last part of the response (block 335—NO), ICAP server 140 may process the part to determine whether there are any security issues associated with the part (block 340). The security issues may involve, for example, virus and/or spyware checking, content filtering, and/or spam, phishing, and/or farming identification.

If ICAP server 140 has been requested to perform a virus check, for example, ICAP server 140 may perform a virus check on the part to determine whether the part includes a virus. ICAP server 140 may also, or alternatively, perform a virus check on the part combined with earlier received parts of the response. For example, ICAP server 140 may identify all received parts of the same response based, for example, on the request identifier included in the ICAP requests associated with the parts. ICAP server 140 may combine the part with previously-received parts of the same response and then perform a virus check on the combined parts.

When there are no security issues associated with the part, ICAP server 140 may store information associated with the part (block 345). In one implementation, the information includes the part itself. ICAP server 140 may be configured to store the information for a predetermined amount of time (e.g., 30 minutes). If ICAP server 140 has not received the next part or last part in the response within the predetermined amount of time, ICAP server 140 may discard the information. If another part is received after the predetermined amount of time, server 120 may be instructed to resend the entire response.

ICAP server 140 may inform network device 130 whether there are any security issues associated with the part (block 350) (FIG. 3C). In one implementation, ICAP server 140 may send the part of the response back to network device 130, along with information whether there are any security issues associated with the part.

If there are security issues associated with the part (block 355—YES), the part may be dropped (block 360). The part may be dropped by network device 130 and/or ICAP server 140. As described above, network device 130 may receive the part from ICAP server 140 and may proceed to drop the part. Alternatively, or additionally, ICAP server 140 may drop the part with or without sending the part to network device 130. If ICAP server 140 drops the part without sending the part to network device 130, ICAP server 140 may inform network device 130 that the part was dropped and/or the reason why the part was dropped. Instead of dropping the part, network device 130 may forward the part to client 110 with a notification that the response contains a security issue.

Network device 130 may optionally inform client 110 that the part has been dropped (block 365). Network device 130 may also inform client 110 as to the reason why the part was dropped (e.g., a virus was detected). Alternatively, network device 130 may tell client 110 nothing. In this case, client 110 may be caused to time-out waiting for receipt of all of the parts of the response.

If there are no security issues associated with the part (block 355—NO), then network device 130 may forward the part of the response to client 110 (block 370). For example, network device 130 may send the parts of the response to client 110 separately instead of waiting for all of the parts to be received. Processing may then continue with network device 130 receiving another part of the response and sending the part to ICAP server 140 in block 325 (FIG. 3A).

Returning to FIG. 3B, when the part is the last part of the response (block 335—YES), ICAP server 140 may combine the part with the other parts of the response that were previously received and stored by ICAP server 140 (block 375) (FIG. 3D). ICAP server 140 may identify the appropriate parts of the response based on, for example, the request identifier included in the ICAP requests associated with the parts. ICAP server 140 may then combine the identified parts to form the entire response.

ICAP server 140 may then process the entire response to determine whether there are any security issues associated with the response (block 380). For example, ICAP server 140 may perform the service on the entire response that it has been requested to perform by network device 130. In one implementation, the service relates to the identification of security issues, such as virus and/or spyware checking, content filtering, and/or spam, phishing, and/or farming identification. If ICAP server 140 has been requested to perform a virus check, for example, ICAP server 140 may perform a virus check on the entire response to determine whether the response includes a virus.

Processing may then continue with ICAP server 140 informing network device 130 whether there are any security issues associated with the part (block 350) (FIG. 3C). In the case that there are no security issues associated with the response, client 110 may receive the individual parts and combine them together to obtain the entire response. Alternatively, network device 130 may wait for all of the parts to be received prior to sending the entire response to client 110.

EXAMPLES

Virus or SpyWare Checking

The ICAP server may be configured to perform virus or spyware checking on responses. FIG. 5 is a diagram of an exemplary implementation for performing virus or spyware checking. As shown in FIG. 5, assume that a server is sending a file to a client and has divided the file into N parts (where N>1). For the description to follow, assume that N=3. The server may send each file part (e.g., file part 1, . . . , file part N) separately to the network device. Assume that the file contains a virus or spyware that cannot be detected in any one of the file parts alone.

The network device may receive file part 1 and forward it to the ICAP server within a request for the ICAP server to perform a virus or spyware check. The ICAP server may receive the request and determine whether file part 1 is the last part of the file. In this case, the ICAP server determines that file part 1 is not the last part of the file. The ICAP server may then perform the virus/spyware check on file part 1. The ICAP server may inform the network device of the result of the virus/spyware check. If file part 1 has been determined to include a virus/spyware, then the network device may drop file part 1 and may inform the client. If file part 1 has not been determined to include a virus/spyware, the ICAP server may store file part 1 and the network device may forward file part 1 to the client.

The network device may receive file part 2 and forward it to the ICAP server within a request for the ICAP server to perform a virus or spyware check. The ICAP server may receive the request and determine whether file part 2 is the last part of the file. In this case, the ICAP server determines that file part 2 is not the last part of the file. The ICAP server may then perform the virus/spyware check on file part 2 and/or the combination of file part 1 and file part 2. The ICAP server may inform the network device of the result of the virus/spyware check. If file part 2 or the combination of file part 1 and file part 2 has been determined to include a virus/spyware, then the network device may drop file part 2 and may inform the client. If file part 2 or the combination of file part 1 and file part 2 has not been determined to include a virus/spyware, the ICAP server may store file part 2 and the network device may forward file part 2 to the client.

The network device may receive file part N and forward it to the ICAP server within a request for the ICAP server to perform a virus or spyware check. The ICAP server may receive the request and determine whether file part N is the last part of the file. In this case, the ICAP server determines that file part N is the last part of the file. The ICAP server may combine file part N with the other parts of the file that it has previously received and stored (i.e., file parts 1 and 2) to form the entire file. The ICAP server may then perform the virus/spyware check on the entire file. The ICAP server may inform the network device of the result of the virus/spyware check. If file has been determined to include a virus/spyware, then the network device may drop file part N and may inform the client. If the file has not been determined to include a virus/spyware, the network device may forward file part N to the client.

Content Filtering

The ICAP server may be configured to perform content filtering on responses. FIG. 6 is a diagram of an exemplary implementation for performing content filtering. Content filtering may involve the analysis of responses against a set of policies. The policies may include rules established by a company, such as rules that particular information cannot be sent outside the company's network or that certain information cannot be downloaded to a client on the company's network. Alternatively, the policies may include rules established by an individual, such as rules that particular content cannot be sent from or downloaded to a client.

As shown in FIG. 6, assume that a client is sending an instant message (IM) regarding secret company information and, in an attempt to thwart company rules, divides the instant message into N parts (where N>1), where none of the IM parts alone violate the company rules. For the description to follow, assume that N=3. The client may send each IM part (e.g., IM part 1, . . . , IM part N) separately to the network device.

The network device may receive IM part 1 and forward it to the ICAP server within a request for the ICAP server to perform content filtering. In the case of instant messages, the network device may associate all instant messages belonging to the same session as part of the same instant message. A session might be defined as communication between a particular source and a particular destination or from a particular source during some time period.

The ICAP server may receive the request and determine whether IM part 1 is the last part of the instant message. In this case, the ICAP server determines that IM part 1 is not the last part of the instant message. The ICAP server may then perform the content filtering on IM part 1. For example, the ICAP server may check the content of IM part 1 against a set of policies to determine whether there is a violation.

The ICAP server may inform the network device of the result of the content filtering. If IM part 1 has been determined to violate the set of policies, then the network device may drop IM part 1 and may inform the client. If IM part 1 has not been determined to violate the set of policies, the ICAP server may store IM part 1 and the network device may forward IM part 1 toward the destination.

The network device may receive IM part 2 and forward it to the ICAP server within a request for the ICAP server to perform content filtering. The ICAP server may receive the request and determine whether IM part 2 is the last part of the instant message. In this case, the ICAP server determines that IM part 2 is not the last part of the instant message. The ICAP server may then perform content filtering on IM part 2 and/or the combination of IM part 1 and IM part 2. The ICAP server may inform the network device of the result of the content filtering. If IM part 2 or the combination of IM part 1 and IM part 2 has been determined to violate the set of policies, then the network device may drop IM part 2 and may inform the client. If IM part 2 or the combination of IM part 1 and IM part 2 has not been determined to violate the set of policies, the ICAP server may store IM part 2 and the network device may forward IM part 2 toward the destination.

The network device may receive IM part N and forward it to the ICAP server within a request for the ICAP server to perform content filtering. The ICAP server may receive the request and determine whether IM part N is the last part of the instant message. In this case, the ICAP server determines that IM part N is the last part of the instant message. The ICAP server may combine IM part N with the other parts of the instant message that it has previously received and stored (i.e., IM parts 1 and 2) to form the entire instant message. The ICAP server may then perform content filtering on the entire instant message. The ICAP server may inform the network device of the result of the content filtering. If instant message has been determined to violate the set of policies, then the network device may drop IM part N and may inform the client. If the instant message has not been determined to violate the set of policies, the network device may forward IM part N toward the destination.

Identification of Spam, Phishing, or Farming

The ICAP server may be configured to perform spam, phishing, or farming identification with regard to responses. FIG. 7 is a diagram of an exemplary implementation for performing spam, phishing, or farming identification. As shown in FIG. 7, assume that a server is sending an email to a client and has divided the email into N parts (where N>1). For the description to follow, assume that N=3. The server may send each email part (e.g., email part 1, . . . , email part N) separately to the network device. Assume that the email contains spam, phishing, or farming that cannot be detected in any one of the email parts alone.

The network device may receive email part 1 and forward it to the ICAP server within a request for the ICAP server to perform spam, phishing, or farming identification. The ICAP server may receive the request and determine whether email part 1 is the last part of the email. In this case, the ICAP server determines that email part 1 is not the last part of the email. The ICAP server may then perform spam, phishing, or farming identification on email part 1. The ICAP server may inform the network device of the result of the spam, phishing, or farming identification. If email part 1 has been determined to be associated with spam, phishing, or farming, then the network device may drop email part 1 and may inform the client. If email part 1 has not been determined to be associated with spam/phishing/farming, the ICAP server may store email part 1 and the network device may forward email part 1 to the client.

The network device may receive email part 2 and forward it to the ICAP server within a request for the ICAP server to perform spam, phishing, or farming identification. The ICAP server may receive the request and determine whether email part 2 is the last part of the email. In this case, the ICAP server determines that email part 2 is not the last part of the email. The ICAP server may then perform spam, phishing, or farming identification on email part 2 and/or the combination of email part 1 and email part 2. The ICAP server may inform the network device of the result of the spam, phishing, or farming identification. If email part 2 or the combination of email part 1 and email part 2 has been determined to be associated with spam/phishing/farming, then the network device may drop email part 2 and may inform the client. If email part 2 or the combination of email part 1 and email part 2 has not been determined to be associated with spam/phishing/farming, the ICAP server may store email part 2 and the network device may forward email part 2 to the client.

The network device may receive email part N and forward it to the ICAP server within a request for the ICAP server to perform spam, phishing, or farming identification. The ICAP server may receive the request and determine whether email part N is the last part of the email. In this case, the ICAP server determines that email part N is the last part of the email. The ICAP server may combine email part N with the other parts of the email that it has previously received and stored (i.e., email parts 1 and 2) to form the entire email. The ICAP server may then perform spam, phishing, or farming identification on the entire email. The ICAP server may inform the network device of the result of the spam, phishing, or farming identification. If the email has been determined to be associated with spam/phishing/farming, then the network device may drop email part N and may inform the client. If the email has not been determined to be associated with spam/phishing/farming, the network device may forward email part N to the client.

CONCLUSION

Implementations consistent with the principles of the invention may relate to processing associated with a network device and/or an ICAP server in detecting security issues in responses that include multiple separately transmitted parts.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 3A-3D, the order of the acts may differ in other implementations consistent with the principles of the invention. Also, non-dependent acts may be performed in parallel.

Also, it has been described that a response may be divided because the response is too large and may cause a device to time-out. It may also be possible for a client to cause a response to be divided into parts. For example, the client may request the response, get interrupted after receiving a portion of the response, and later request the response again. In this case, the server may send the entire response in response to the first request and then send a portion (perhaps an overlapping portion) of the response in response to the later request.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An Internet Content Adaptation Protocol (ICAP) server, comprising:
a memory; and
a processor, connected to the memory, to:
receive a part of a response that includes a plurality of parts,
combine the part of the response with at least one previously received part of the response stored in the memory to obtain combined parts of the response, where the combined parts of the response include fewer than all of the plurality of parts of the response,
process the part of the response to determine whether a security issue is associated with the part of the response,
process the combined parts of the response to determine whether a security issue is associated with the combined parts of the response,
cause the part of the response to be dropped when a security issue is associated with the part of the response or the combined parts of the response,
determine whether the part of the response is a last part of the response,
store the part of the response in the memory when the part of the response is not the last part of the response and no security issue is associated with the part of the response or the combined parts of the response,
determine whether a next part of the response or a last part of the response has been received within a particular amount of time, and
drop the part of the response from the memory when the next part of the response or the last part of the response has not been received within the particular amount of time, and
cause the part of the response to be transmitted toward a destination when no security issue is associated with the part of the response or the combined parts of the response.

2. The ICAP server of claim 1, where the processor is to:
receive a first part of the response,
process the first part of the response to determine whether a security issue is associated with the first part of the response, and
store the first part of the response in the memory when no security issue is associated with the first part of the response.

3. The ICAP server of claim 2, where the processor is further to:
cause the first part of the response to be transmitted toward the destination when no security issue is associated with the first part of the response, and
cause the first part of the response to be dropped when a security issue is associated with the first part of the response.

4. The ICAP server of claim 1, where the processor is to receive the part of the response within an ICAP request.

5. The ICAP server of claim 4, where the ICAP request includes:
an ICAP header that includes:
a request identifier that uniquely corresponds to the response, and
a part number that uniquely identifies the part with regard to other ones of the plurality of parts, and
an ICAP body that includes data associated with the part.

6. The ICAP server of claim 5, where at least one of the ICAP header or the ICAP body includes a last identifier that identifies whether the part is a last part of the response.

7. The ICAP server of claim 4, where the ICAP request includes:
an ICAP header that includes:
a request identifier that uniquely corresponds to the response, and
a byte range that identifies a set of bytes of the response associated with the part, and
an ICAP body that includes data associated with the part.

8. The ICAP server of claim 7, where at least one of the ICAP header or the ICAP body includes a last identifier that identifies whether the part is a last part of the response.

9. The ICAP server of claim 1, where the response includes one of an email, an instant message, a file, or a web page.

10. The ICAP server of claim 1, where, when processing the combined parts of the response, the processor is to perform a service on the combined parts of the response, where the service includes at least one of checking for a virus, checking for spyware, performing content filtering, identifying spam, identifying phishing, or identifying farming.

11. An Internet Content Adaptation Protocol (ICAP) server, comprising:
a memory; and
a processor, connected to the memory, to:
receive a particular part of a response that includes a plurality of parts,
process the particular part of the response to determine whether there is a security issue associated with the particular part of the response before a last part of the response is received,
store the particular part of the response in the memory when there is no security issue associated with the particular part of the response,
determine whether a next part of the response or the last part of the response has been received within a particular amount of time of receiving or storing the particular part of the response,
drop the particular part of the response from the memory when the next part of the response or the last part of the response has not been received within the particular amount of time,
receive the last part of the response,
combine the last part of the response with at least the particular part of the response to obtain combined parts of the response, where the combined parts of the response include fewer than all of the plurality of parts of the response,
process the combined parts of the response to determine whether there is a security issue associated with the combined parts of the response, and
cause the last part of the response to be transmitted toward a destination when there is no security issue associated with the combined parts of the response.

12. The ICAP server of claim 11, where the processor is further to cause the particular part of the response to be transmitted toward the destination before receiving the last part of the response when there is no security issue associated with the particular part of the response.

13. A system comprising:
a network device to receive a plurality of parts of a response associated with a client, the response being divided into the plurality of parts, and individually transmit each of the plurality of parts,
the system further comprising:
a server, connected to the network device, to:
receive one of the plurality of parts from the network device, determine whether a next part, of the plurality of parts, is received within a particular amount of time of receiving the one of the plurality of parts, drop the one of the plurality of parts when the next part is not received within the particular amount of time, combine the one of the plurality of parts with all of the plurality of parts that were previously received from the network device to obtain combined parts, where the combined parts include fewer than all of the plurality of parts, process the combined parts to determine whether a security issue is associated with the combined parts, cause the one of the plurality of parts to be dropped when a security issue is associated with the combined parts, and cause the one of the plurality of parts to be transmitted toward a destination when no security issue is associated with the combined parts.

14. The system of claim 13, where the server is further to:
cause the network device to transmit the one of the plurality of parts toward the client or a destination identified by the client, before a last one of the plurality of parts is received by the network device, when no security issue is associated with the combined parts.

15. The system of claim 13, where at least one of the server or the network device is to:
drop the one of the plurality of parts when a security issue is associated with the combined parts.

16. The system of claim 13, where the server is to receive the one of the plurality of parts from the network device within an Internet Content Adaptation Protocol (ICAP) request.

17. The system of claim 16, where the ICAP request includes:
an ICAP header that includes:
a request identifier that uniquely corresponds to the response, and
a part number that uniquely identifies the one of the plurality of parts with regard to other ones of the plurality of parts, and
an ICAP body that includes data associated with the one of the plurality of parts.

18. The system of claim 17, where at least one of the ICAP header or the ICAP body includes a last identifier that identifies whether the one of the plurality of parts is a last part of the response.

19. The system of claim 16, where the ICAP request includes:
an ICAP header that includes:
a request identifier that uniquely corresponds to the response, and
a byte range that identifies a set of bytes of the response associated with the one of the plurality of parts, and
an ICAP body that includes data associated with the one of the plurality of parts.

20. The system of claim 19, where at least one of the ICAP header or the ICAP body includes a last identifier that identifies whether the one of the plurality of parts is a last part of the response.

21. The system of claim 13, where the response includes one of an email, an instant message, a file, or a web page.

22. The system of claim 13, where, when processing the combined parts, the server is to perform a service on the combined parts, where the service includes at least one of checking for a virus, checking for spyware, performing content filtering, identifying spam, identifying phishing, or identifying farming.

23. A computer-implemented method comprising:
receiving, by an Internet Content Adaptation Protocol (ICAP) server, a first part of a response that includes a plurality of parts;
storing, by the ICAP server, the first part of the response;
causing, by the ICAP server, the first part of the response to be transmitted toward a destination;
receiving, by the ICAP server, a second part of the response;
determining, by the ICAP server, whether the second part of the response is received within a particular amount of time of receiving the first part of the response;
dropping, by the ICAP server, the first part of the response when the second part of the response is not received within the particular amount of time;
combining, by the ICAP server, the second part of the response with at least the first part of the response, when the second part of the response is received within the particular amount of time, to obtain combined parts of the response, where the combined parts of the response include fewer than all of the plurality of parts of the response;
processing, by the ICAP server, the combined parts of the response to determine whether a security issue is associated with the combined parts of the response;
causing, by the ICAP server, the second part of the response to be transmitted toward the destination when no security issue is associated with the combined parts of the response; and
causing, by the ICAP server, the second part of the response to be dropped when a security issue is associated with the combined parts of the response.

24. The computer-implemented method of claim 23, where the response includes one of an email, an instant message, a file, or a web page.

25. The computer-implemented method of claim 23, where processing the combined parts of the response includes performing a service on the combined parts of the response, where the service includes at least one of checking for a virus, checking for spyware, performing content filtering, identifying spam, identifying phishing, or identifying farming.

26. A server, comprising:
a memory; and
a processor, connected to the memory, to:
receive a part of a response that includes a plurality of parts,
store the part of the response in the memory,
cause the part of the response to be transmitted toward a destination,
receive another part of the response after causing the part of the response to be transmitted toward the destination,
determine whether the other part of the response is received within a particular amount of time of receiving the part of the response,
drop the part of the response when the other part of the response is not received within the particular amount of time;
combine, when the other part of the response is not received within the particular amount of time, the other part of the response with at least the part of the response to obtain combined parts of the response, where the combined parts of the response include fewer than all of the plurality of parts of the response, process the combined parts of the response to determine whether there is a security issue associated with the combined parts of the response, and cause the other part of the response to be transmitted toward the destination when there is no security issue associated with the combined parts of the response.

27. A non-transitory device comprising:

one or more instructions, which when executed by a processor, cause the processor to receive a first part of a response that includes a plurality of parts;

one or more instructions, which when executed by the processor, cause the processor to determine whether a security issue is associated with the first part of the response;

one or more instructions, which when executed by the processor, cause the processor to store the first part of the response when no security issue is associated with the first part of the response;

one or more instructions, which when executed by the processor, cause the processor to determine whether a next part of the response has been received within a particular amount of time of storing the first part of the response, one or more instructions, which when executed by the processor, cause the processor to drop the first part of the response when the next part of the response has not been received within the particular amount of time, one or more instructions, which when executed by the processor, cause the processor to cause the first part of the response to be transmitted toward a destination when no security issue is associated with the first part of the response and when the first part of the response has not been dropped;

one or more instructions, which when executed by the processor, cause the processor to receive a last part of the response after causing the first part of the response to be transmitted;

one or more instructions, which when executed by the processor, cause the processor to combine the last part of the response with at least the first part of the response to obtain combined parts of the response, where the combined parts of the response include fewer than all of the plurality of parts of the response;

one or more instructions, which when executed by the processor, cause the processor to process the combined parts of the response to determine whether a security issue is associated with the combined parts of the response; and one or more instructions, which when executed by the processor, cause the processor to cause the last part of the response to be transmitted toward the destination when no security issue is associated with the combined parts of the response.

* * * * *